Figure 1:
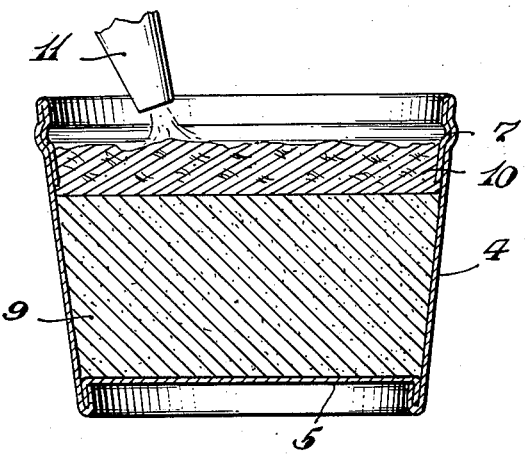

Jan. 27, 1948. F. T. MOSER 2,435,094

PACKAGED SUNDAE

Filed Feb. 20, 1945

Inventor
Frank T. Moser

By Joseph K. Schofield
Attorney

Patented Jan. 27, 1948

2,435,094

UNITED STATES PATENT OFFICE 2,435,094

PACKAGED SUNDAE

Frank T. Moser, Hartford, Conn.

Application February 20, 1945, Serial No. 578,895

1 Claim. (Cl. 99—137)

The invention of which the following is a description relates to a novel packaged sundae or other frozen confection having distinct strata of dissimilar materials, and the method of making such a package.

Specifically the invention is applied to and the following description relates to the packaging of frozen ice cream sundaes. It is customary and usual to market ice cream in frozen condition in individual dispensable containers which may be used as a dish from which the confection may be eaten and then discarded. Such packages are usually in the form of a truncated cone of firm waxed paper having a removable cover or cap which fits closely over the contents and into a peripheral groove in the side wall of the container adjacent the larger end. These are usually known as "paper cups" and are particularly suitable for holding the ice cream during the operation of finally freezing it, keeping it in storage for an indefinite time below freezing temperatures and finally as a dispensable container from which the confection is eaten.

It is frequently desired to include in the confection a layer of syrup or fruit topping. This syrup may have a popular flavor obtained by the use of chocolate, vanilla, or fruits such as strawberries, etc. In these instances the chocolate or vanilla or crushed fruit is present in the syrup. I propose to make use of a special syrup which will not readily solidify and which may be made up in any flavor or type.

It is characteristic of all such syrups or syrup mixtures that they are definitely heavier than the ice cream mixture either in its fluent or partially congealed or frozen state. It has additionally been noted that such syrups have freezing points considerably below the freezing point of the ordinary ice cream mixtures. It follows from these facts that when the dishes or cups are filled first with the ice cream mixture partially congealed, and then with the syrups, the latter has an immediate tendency to sink through the mixture and percolate through the latter before the ice cream can be completely frozen and solidified. Consequently it has been prior practice to place the syrup or fruit mixture in the dish first and then fill the latter with the ice cream mixture so that the final freezing step will leave the ingredients in separate levels. This, however, has necessitated removal of the confection from the cup or dish and required that it be dispensed from a plate, saucer or the like.

I have found that it is possible by my improved method to fill the cup or container first with ice cream and then with its topping of syrup and freeze the contents in such a way that the layers remain separate while the confection is stored an indefinite time. It is also possible by carrying out this method for the retailer to dispense the confection directly from the container, the purchaser using the latter as a serving dish with the semi-liquid syrup in position over the frozen ice cream when the cover of the container is removed.

It is also an object of my invention to provide the particularly arranged package and its contents as a novel product.

Figure 2:
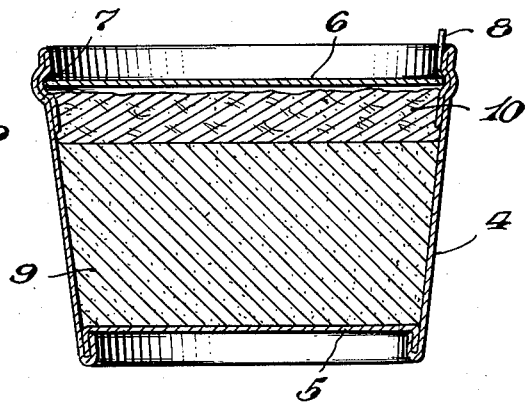
Figure 3:
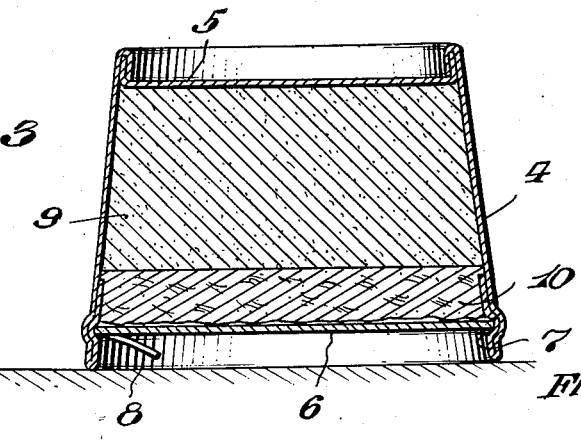

Other objects of my invention will be evident from the following description, due reference being made to the accompanying drawing showing a preferred form of the invention and in which Figure 1 is a vertical section showing the completion of the filling steps;

Fig. 2 is a similar section showing the package sealed and in condition for placing in storage, in transport or in use as a dispensing vessel; and Fig. 3 illustrates by vertical section the manner in which the separate strata are maintained distinct during the final freezing of the ice cream after filling and capping the container.

The container 4 is shown to consist of a standard form of wax paper cup or container. This, as shown, is frusto-conical, the opening being at the larger end. The bottom is a permanent part of the cup or container and forms a permanent closure therefor. The container has a wax paper disk 6 which forms a tight fitting cover pressed firmly into the groove 7 of the side wall of the container. The cover 6 may have the usual tang 8 which forms a grip by which the cover may be removed. The greater portion of the container is filled, as shown, with a semi-fluid mass of ice cream 9. This is introduced in the usual method and in a semi-frozen plastic condition by pouring from a measuring dispensing pump.

The mass of ice cream mixture fills the container to within a short distance of the groove 7. The space above the mixture is then filled with a liquid syrup 10 which may contain particles of fruit or other similar eatables. This mixture or topping may be delivered through a nozzle 11 in the usual way. The syrup preferably completely fills the container 4 up to the groove 7.

Immediately after the container is filled it is capper or covered by means of the disk 6 to seal the contents therein.

If the container 4 and its contents should be subjected to freezing while in an upright position as shown in Figs. 1 and 2, the relatively heavier and more fluent syrup would sink and percolate through the ice cream mixture before the latter can become stiff enough to support the syrup. For this reason a material feature in the improved method is to immediately invert the container 4 into the position shown in Fig. 3. In this position the relatively lighter ice cream mix is disposed above and remains above the layer of fruit syrup. The process of freezing then completes the congealing of the mixture while the container remains inverted after which the container may be set upright again without fear of blending the two ingredients during the storage at low temperature.

During this final freezing and subsequent storage the syrup, if made from a special non-freezing composition, does not solidify. Therefore the package may be dispensed and its contents eaten without removal of the contents to a separate saucer or dish. All that is required is that the cover 6 be removed. It will then be found that the syrup 10 is on top and completely covers the ice cream 9 and that the two may be eaten in the usual manner. In other words, the syrup becomes a sauce to garnish the ice cream in the same manner as when a conventional sundae is served at a counter. I have thus provided a product commonly known as a sundae in its usual form as served at a fountain and in a form which lends itself to satisfactory production, storage and dispensing, ready for consumption, without the necessity of separately serving the confection in a dish.

I have given as an example of my invention the use of a permanently liquid syrup or sauce. It will, however, be realized that keeping the layers of separate ingredients distinct is equally important in the freezing of packages of ice cream in which dissimilar layers including an ice cream mix and a topping are present. Consequently the novel method is useful also where it is desired to include in the packaged confection a minor portion or layer of sauce, syrup, or other topping material heavier than the ice cream. As this forms a garnish or topping it should be placed above and appear in position above the ice cream when the cover is removed.

The syrup or topping should have a low freezing point to make it most desirable for this application and should not solidify at temperatures at which the ice cream remains frozen. It should also soften quickly when the package is opened. A syrup suitable for use with the ice cream in packaged form may preferably comprise crystallized cane or beet sugar, glycerine, a small quantity of water and a vegetable gum or other stabilizer such as agar-agar. The chocolate, vanilla, or other flavoring is added with or without crushed fruit, etc.

While I have illustrated and described preferred embodiments of the method and package, nevertheless the scope of the invention is to be construed as limited only by the following claim.

What is claimed is:

The method of preparing a packaged sundae which comprises partially filling a dish having a permanently closed bottom and a tight-fitting removable cover with a partially congealed ice cream mixture, pouring over the mixture a layer of relatively heavy syrup, fitting the cover closely over the layer of syrup, inverting the dish and completing the congelation of the mixture while said container is inverted.

FRANK T. MOSER.

REFERENCES CITED

The following references are of record in the file of this patent:

UNITED STATES PATENTS

| Number | Name | Date |
| --- | --- | --- |
| 2,005,245 | Stover | June 18, 1935 |
| 2,096,552 | Krein | Oct. 19, 1937 |
| 2,104,805 | Krein | Jan. 11, 1938 |
| 2,167,353 | Frediani | July 25, 1939 |